United States Patent Office 2,698,315
Patented Dec. 28, 1954

2,698,315

EPOXIDE RESINS

Sylvan Owen Greenlee, Racine, Wis., assignor to Devoe & Raynolds Company, Inc., Louisville, Ky., a corporation of New York No Drawing. Application October 21, 1952,
Serial No. 316,077

4 Claims. (Cl. 260—47)

This invention relates to new epoxide resins which are valuable for use in the manufacture of varnishes, molding resins, adhesives, films, fibers, etc. The invention includes the epoxide resins and the method for their manufacture.

The new epoxide resins are polymeric resins made by reacting dihydroxy diphenyl with epichlorhydrin or with glycerol dichlorhydrin with the use of aqueous caustic alkali under regulated conditions to give complex polymeric polyether epoxide derivatives of the dihydroxy diphenyl.

The dihydroxy diphenyl or diphenol includes the p,p'-, o,o'-, and the m,m'-, dihydroxy diphenyls, as well as mixtures thereof or dihydroxy diphenyls containing the hydroxyl groups in different positions, e. g., o,p-, etc. The dihydroxy diphenyls are commonly referred to as diphenols.

In making the new epoxide resins, the proportions of dihydroxy diphenyl and of epichlorhydrin or glycerol dichlorhydrin vary from proportions where there is a small but substantial excess of epichlorhydrin or glycerol dichlorhydrin up to two or more than two parts of epichlorhydrin or glycerol dichlorhydrin to one of dihydroxy diphenyl, together with sufficient caustic alkali to combine with the chlorine of the epichlorhydrin or glycerol dichlorhydrin that reacts with the diphenol and advantageously an excess of caustic alkali somewhat above that amount.

In making the new resins, there is used an excess of the chlorhydrin, substantially exceeding 1 mol of chlorhydrin to 1 mol of diphenol, and advantageously an amount of at least 1.16 mols of the chlorhydrin to one of diphenol. The amount of chlorhydrin may be advantageously less than 2 mols, e. g., of epichlorhydrin to one of diphenol. Somewhat lower melting point products are produced when two mols of epichlorhydrin are used to one of diphenol, or in excess of this ratio.

In making the new resins, the reaction of the diphenol with the chlorhydrin (epichlorhydrin or glycerol dichlorhydrin) is advantageously carried out with the use of aqueous caustic alkali in amount sufficient to combine with the chlorine of the chlorhydrin used or an amount somewhat in excess. Thus, where diphenol is reacted with epichlorhydrin, the proportion of alkali used is sufficient to combine with the chlorine of the epichlorhydrin or an amount somewhat in excess of that amount. When glycerol dichlorhydrin is used, the amount of alkali is sufficient to combine with the chlorine of the dichlorhydrin or an amount somewhat in excess of that amount. And when mixtures of epichlorhydrin and glycerol dichlorhydrin are used, the amount of alkali is similarly sufficient to combine with the halogen of the halohydrins and with the chlorine of the chlorhydrins or somewhat in excess of that amount.

Products of a predetermined degree of polymerization and of different degrees of polymerization can be obtained by regulating the proportions of the reactants used. The range of proportions and the degree of polymerization can be varied over a considerable range.

The new polymeric epoxide resins contain both terminal epoxide groups and intermediate alcoholic hydroxyl groups and may, to some extent, contain terminal alcoholic hydroxyl groups. They are, in general, water insoluble resinous products varying in consistency and melting point and are capable of polymerization by the addition of small amounts of suitable polymerization agents such as sodium phenoxide or difunctional phenoxides, to give products which form valuable molding compositions and articles or which can be used in making coating compositions, films, etc. This further polymerization, in the presence of polymerizing agents other than polyfunctional phenoxides, appears to be largely or mainly one of further reaction of terminal epoxide groups with hydroxyl groups. The polymerization takes place by direct addition-reaction and without evolution of by-products.

The new epoxide resins can advantageously be used for reaction with additional dihydric phenol to produce higher melting point epoxide resins, as described in my companion application Serial No. 250,951 filed October 11, 1951, now Patent No. 2,615,008. By freeing the resin from salt and excess alkali and then admixing additional dihydric phenol in amount less than that sufficient to react with the epoxide groups of the epoxide resin, it is possible to produce high melting point epoxide resins which need no further purification, since no byproducts have formed in this further reaction of the epoxide resin with the dihydric phenol.

The nature and advantages of the invention will be further illustrated by the following specific examples, but it will be understood that the invention is not limited thereto. The parts are by weight.

The epoxide group content of the complex epoxide resins was determined for practical purposes by determining the equivalent weight of the composition per epoxide group. The method used for determining the epoxide content of the epoxide resins hereinafter indicated was by heating one gram sample of the epoxide composition with an excess of pyridine containing hydrochloride (made by adding 16 cc. of concentrated hydrochloric acid per liter of pyridine) at the boiling point for 20 minutes and back titrating the excess pyridine hydrochloride with 0.1 N sodium hydroxide using phenolphthalein as indicator, and considering that 1 HCl is equivalent to one epoxide group.

Example 1.—To a solution of 93 parts of p,p'-dihydroxydiphenyl and 45 parts of sodium hydroxide (97%) in 2000 parts of water at 50° C. was added 92.5 parts of epichlorohydrin. The temperature was raised to 100° C. and held at 95 to 100° C. for 30 minutes. The white solid product was removed by filtration and washed three times with water to remove salt and unreacted alkali. A fourth wash was slightly acidified with hydrochloric acid, and a fifth wash with acetone was made for the purpose of reducing the water content of the powder. The powder was dried in an oven at 100° C. to give a product having a melting point of 250–260° C. and an epoxide equivalent of 896.

Example 2.—Following the procedure of Example 1, 93 parts of p,p'-diphenol was allowed to react with 69.4 parts of epichlorhydrin in the presence of 37 parts of sodium hydroxide. The resulting product was a powder similar in appearance to that of Example 1, with a melting point of 260–270° C. and an epoxide equivalent of 1430.

Example 3.—Following the procedure of Example 1, 93 parts of p,p'-diphenol was allowed to react with 55.5 parts of epichlorhydrin in the presence of 30 parts of sodium hydroxide. The resulting solid product had a melting point of 280–290° C. and an epoxide equivalent of 2400.

Example 4.—93 parts of p,p'-diphenol was admixed with 1387 parts of epichlorhydrin in a vessel provided with a stirrer and reflux condenser, and this mixture was heated to 110° C. to dissolve the diphenol, and 42 parts of 97% flake sodium hydroxide was then added, and the reaction mixture was refluxed for 45 minutes. Part of the epichlorhydrin was then slowly distilled so as to remove the water formed during the reaction with it, and, after collecting about 200 parts of distillate, the hot reaction mixture was filtered to remove salt and most of the epichlorhydrin was removed from the filtrate by vacuum distillation. The solid residue was washed with benzene to give a white crystalline product having a melting point of 151–154° C. and an epoxide equivalent of 155. Recrystallization from benzene gave a product melting at 161° C.

The new epoxide resins, when heated in the presence of alkali catalysts, can be converted into insoluble, infusible products. For example, when 0.1 part of sodium phenoxide was added to 5 parts of the molten product of Example 4, the product quickly polymerized to an infusible product. Similarly, when the product of Example 2 was heated with 4% diethylene triamine, an infusible solid reaction product was formed.

The reaction products can be used for various purposes, including esterification with acids to form esters, as illustrated by the following example.

*Example 5.*—A mixture of 58 parts of the product of Example 4 and 180 parts of dehydrated castor oil acids was heated to 260° C. and held at this temperature for 5½ hours with xylene reflux to remove water. The product was cut to 47.3% solids with xylene to give a product having an acid value of 6.8 and a viscosity of T (Gardner-Holdt). With 0.3% lead and 0.03% cobalt dryers, the varnish dried to a tack-free film in 2½ hours.

In a similar manner, the product of Example 1 can be esterified with soya fatty acids to form drying oil esters.

The new complex polymeric epoxides, containing reactive epoxide groups, can be reacted with compounds containing active hydrogen, such as amines, and particularly polyamines, amides, mercaptans, polyhydric alcohols, polyimines, etc. to give a wide variety of valuable reaction products. Thus difunctional reactants or polyfunctional reactants may serve to cross-link different molecules through reaction with terminal epoxide groups, and in some cases through intermediate hydroxyl groups. By using a difunctional reactant or polyfunctional reactant that reacts with epoxide groups but not with hydroxyl groups, in proportions equivalent to the epoxide groups, different molecules may be joined together by cross-linking in this way. Where cross-linking reagents are used that react with hydroxyl, or with both hydroxyl and epoxy groups, a different and more complex structure may be obtained. The use of less than the equivalent amount of cross-linking reagents enables modified products to be obtained, and in some cases infusible products.

Thus by compounding the new complex epoxide compositions with an amount of polyhydric phenol, approximately equivalent to the epoxide content of the composition, and with the use of a small amount of catalyst such as the alkali salt of the polyhydric phenol, the resulting mixture on heating will cause reaction between the polyhydric phenol and the epoxide groups with resulting cross-linking and the production of higher molecular and infusible products.

Similarly, the new complex epoxides can advantageously be reacted with amines to form valuable amine-epoxy reaction products which may be infusible products having valuable properties for making films, molded compositions, etc.

Other polyfunctional cross-linking reactants which react with epoxide or hydroxyl groups can similarly be used for bringing about cross-linking and the conversion of the new epoxides to infusible products including diisocyanates, e. g., methylene bis (4 phenyl) isocyanate, dialdehydes, e. g., glyoxal, dimercaptans, amides, polyamides, etc.

Thus, the new epoxide products and compositions are valuable as raw materials in the manufacture of varnishes, molding resins, adhesives, fibers or filaments, etc. They are capacle of polymerization in the presence of catalysts or by the use of cross-linking reactants.

Where the polymerization of the complex epoxy-hydroxy compositions takes place through reaction of epoxides with hydroxyl groups, the polymerization products may be free, or relatively free, from epoxy groups and contain only or mainly hydroxyl groups in addition to hydrocarbon residues. The complex products vary from soft to brittle solids. The polymerized products give compositions varying from hard, brittle, fusible solids to hard, non-brittle, infusible solids. The new complex epoxide compounds polymerize to give products containing a high percentage of hydroxyl groups.

The new epoxide resins are also useful for esterification with organic acids to form esters which are useful as plasticizers or as drying oil compositions, etc., depending upon the type of organic acid used. Esters of the new complex epoxide resins with higher unsaturated acids such as those derived from unsaturated oils are excellent drying compositions. Esters derived from long chain saturated acids, such as lauric, palmitic and stearic acids, gave wax-like products useful as waxes and plasticizers. Many variations and types of useful products may be obtained by esterifying the new epoxide resins with various combinations of saturated and unsaturated monobasic and polybasic and resin acids or the anhydrides of such acids.

This application is a continuation-in-part of my prior application Serial No. 250,951 filed October 11, 1951, now Patent No. 2,615,008, which in turn is a continuation-in-part of my prior applications Serial Nos. 189,063, filed October 7, 1950, and 199,932, filed December 8, 1950, both now abandoned, which are in turn respectively continuations-in-part of my prior applications Serial Nos. 621,856 filed October 11, 1945 and 617,176 filed September 18, 1945, now abandoned.

I claim:
1. The process of producing complex epoxide resins which consists essentially of reacting diphenol with an excess of a chlorhydrin selected from the class which consists of epichlorhydrin and glycerol dichlorhydrin, the proportions of chlorhydrin to diphenol being in excess of 1:1 and not more than about 2:1, in the presence of caustic alkali, and continuing the reaction to produce a solid water-insoluble resinous product.

2. Epoxide resins produced in accordance with the process of claim 1.

3. The process of producing complex epoxy resins which consists essentially of reacting p,p' diphenol with an excess of a chlorhydrin selected from the class which consists of epichlorhydrin and glycerol dichlorhydrin, the proportions of chlorhydrin and diphenol being in excess of 1:1 and not more than about 2:1, in the presence of caustic alkali, and continuing the reaction to produce a solid, water-insoluble, resinous product.

4. Epoxide resin produced in accordance with the process of claim 3.

References Cited in the file of this patent

UNITED STATES PATENTS

| Number | Name | Date |
|---|---|---|
| 2,319,876 | Moss | May 25, 1943 |
| 2,602,075 | Carpenter | July 1, 1952 |
| 2,637,715 | Ott | May 5, 1953 |

FOREIGN PATENTS

| Number | Country | Date |
|---|---|---|
| 652,024 | Great Britain | Apr. 11, 1951 |